United States Patent
Li et al.

(10) Patent No.: US 9,290,650 B2
(45) Date of Patent: *Mar. 22, 2016

(54) POLYPROPYLENE AND POLYLACTIC ACID FORMULATIONS FOR HEAT SEAL APPLICATIONS

(71) Applicant: FINA TECHNOLOGY, INC., Houston, TX (US)

(72) Inventors: Fengkui Li, Houston, TX (US); John Ashbaugh, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/220,997

(22) Filed: Mar. 20, 2014

(65) Prior Publication Data

US 2014/0235791 A1 Aug. 21, 2014

Related U.S. Application Data

(63) Continuation of application No. 13/019,515, filed on Feb. 2, 2011, now Pat. No. 8,796,383, which is a continuation-in-part of application No. 12/165,051, filed on Jun. 30, 2008, now Pat. No. 8,759,446.

(51) Int. Cl.

| | | |
|---|---|---|
| *C08L 23/00* | (2006.01) | |
| *C08L 23/26* | (2006.01) | |
| *C08J 5/18* | (2006.01) | |
| *C08L 23/10* | (2006.01) | |
| *C08L 67/04* | (2006.01) | |
| *C08L 51/00* | (2006.01) | |
| *C08L 23/08* | (2006.01) | |
| *C08L 33/06* | (2006.01) | |
| *C08L 51/06* | (2006.01) | |

(52) U.S. Cl.
CPC .. *C08L 23/26* (2013.01); *C08J 5/18* (2013.01); *C08L 23/10* (2013.01); *C08L 51/003* (2013.01); *C08L 67/04* (2013.01); *C08J 2323/12* (2013.01); *C08L 23/0884* (2013.01); *C08L 33/068* (2013.01); *C08L 51/06* (2013.01); *C08L 2203/16* (2013.01)

(58) Field of Classification Search
None
See application file for complete search history.

(56) References Cited

U.S. PATENT DOCUMENTS

| | | |
|---|---|---|
| 2,758,987 A | 8/1956 | Salzberg |
| 5,216,050 A * | 6/1993 | Sinclair ................... 524/108 |
| 5,310,865 A | 5/1994 | Enomoto et al. |

FOREIGN PATENT DOCUMENTS

JP 2005-307128 * 11/2005

OTHER PUBLICATIONS

Sun, Journal of Applied Polymer Science, vol. 57, 1043-1054 (1995).*
Computer translation of JP2005-307128 (2005).*

* cited by examiner

*Primary Examiner* — Robert C Boyle
(74) *Attorney, Agent, or Firm* — Albert Shung

(57) ABSTRACT

Films (or a cap layer of co-extruded films) and methods of forming the same are described herein. The films generally include a modified olefin based polymer including polypropylene and from 1 wt. % to 30 wt. % polylactic acid (PLA), wherein the modified olefin based polymer exhibits a seal initiation temperature (SIT) that is at least 5° C. less than a seal initiation temperature of the polypropylene absent the PLA and a hot tack range of at least 20° C.

21 Claims, 6 Drawing Sheets

POLYPROPYLENE AND POLYLACTIC ACID FORMULATIONS FOR HEAT SEAL APPLICATIONS

CROSS-REFERENCE TO RELATED APPLICATIONS

This application is a Continuation of U.S. application Ser. No. 13/019,515, filed on Feb. 2, 2011, which is a Continuation-in-part of U.S. application Ser. No. 12/165,051, filed on Jun. 30, 2008.

FIELD

This invention relates to polyolefin modification and more particularly to the improvement of heat-seal properties by lowering seal initiation temperature (SIT).

BACKGROUND

Polyolefins, such as polypropylene and polyethylene have been used in many applications, for example in packaging applications. To form the package, it is often necessary to obtain a seal between two different parts formed of the same polyolefin. This may be clone using adhesives, but is more commonly done by applying heat to the surfaces to be joined to soften or melt them while applying pressure to form a single piece of thermoplastic. This operation is called heat-sealing, and is commonly used to join thermoplastic parts.

Efforts to improve heat sealing are a continuous focus of improvements.

SUMMARY

Embodiments of the present invention include films (or a cap layer of co-extruded films). The films generally include a modified olefin based polymer including polypropylene and from 1 wt. % to 30 wt. % polylactic acid (PLA). wherein the modified olefin based polymer exhibits a seal initiation temperature (SIT) that is at least 5° C. less than a seal initiation temperature of the polypropylene absent the PLA and a hot tack range of at least 20° C.

One or more embodiments include the film of the preceding paragraph, wherein the polypropylene is a metallocene formed random copolymer.

One or more embodiments include the film of any preceding paragraph, wherein the film exhibits a seal initiation temperature that is less than 125° C.

One or more embodiments include the film of any preceding paragraph, wherein the polypropylene is a metallocene formed isotactic polypropylene.

One or more embodiments include the film of any preceding paragraph, wherein the polypropylene includes from about 0.5 wt. % to about 5 wt. % ethylene.

One or more embodiments include the film of any preceding paragraph, wherein the polypropylene includes ethylene in an amount of less than about 0.5 wt. %.

One or more embodiments include the film of any preceding paragraph, wherein the polypropylene is a metallocene formed high density polyethylene.

One or more embodiments include the film of any preceding paragraph, wherein the polypropylene is a Ziegler-Natta formed random copolymer.

One or more embodiments include the film of any preceding paragraph, wherein the film further exhibits a hot tack range between 80° C. and 120° C.

One or more embodiments include the film of any preceding paragraph, wherein the modified olefin based polymer includes from 5 wt. % to 20 wt. % PLA.

One or more embodiments include the film of any preceding paragraph, wherein the PLA is amorphous, crystalline or a combination thereof.

One or more embodiments include the film of any preceding paragraph, wherein the PLA is crystalline.

One or more embodiments include the film of any preceding paragraph, wherein the modified olefin based polymer includes from 1-10% reactive modifier.

One or more embodiments include a method of forming the film of any preceding paragraph. The methods generally include providing the modified olefin based polymer and forming the modified olefin based polymer into a film.

DETAILED DESCRIPTION

Introduction and Definitions

Figure 1:
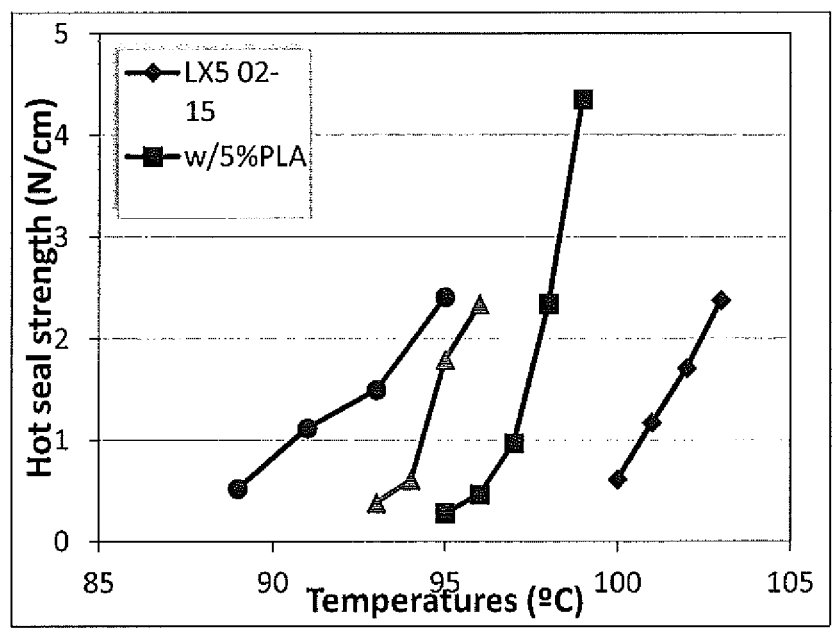
FIG. 1 illustrates heat seal curves for various polymer samples in Example 1.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of tiling. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymer films are described herein. The films generally include a modified olefin based polymer. The modified olefin based polymer may include a polypropylene and polylatic acid blend.

The olefin based polymers (used interchangeable herein with the term "polyolefins") are generally produced by polymerizing one or more olefin monomers via known catalyst systems, such as single site transition metal catalyst systems including metallocene catalyst systems, or Ziegler-Natta catalyst systems or combinations thereof, for example.

In one or more embodiments, the polyolefins include propylene based random copolymers. Unless otherwise specified, the term "propylene based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt. % to about 5.0 wt. %, or from about 0.6 wt. % to about 3.0 wt. % comonomer relative to the total weight of polymer, for example.

The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

The propylene based random copolymers may exhibit a melt flow rate of at least about 0.1 dg./10 min., or from about 5 dg./10 min. to about 30 dg./10 min. or from about 10 dg./10 min. to about 20 dg./10 min., for example.

The olefin based polymers are contacted with polylactic acid (PLA) to form the modified polyolefin (which may also be referred to herein as a blend or blended material). Such contact may occur by a variety of methods. For example, such contact may include blending of the olefin based polymer and the polylactic acid under conditions suitable for the formation of a blended material. Such blending may include dry blending, extrusion, mixing or combinations thereof, for example.

The modified polyolefin may include at least 50 wt. %, or from about 51 wt. % to about 99 wt. %, or from about 70 wt. % to about 95 wt. % or from about 80 wt. % to about 90 wt. % olefin based polymer based on the total weight of the modified polyolefin, for example.

Polylactic acid is a biodegradable, thermoplastic, aliphatic polyester derived from renewable resources, such as corn starch or sugarcane. Bacterial fermentation may be used to produce lactic acid from corn starch or can sugar. However, lactic acid cannot be directly polymerized to a useful product. Instead, lactic acid is generally converted to polylactic acid.

The polylactic acid may include any polylactic acid capable of blending with an olefin based polymer. For example, the polylactic acid may be selected from poly-L-lactide (PLLA), poly-D-lactide (PDLA), poly-LD-lactide (PDLLA) and combinations thereof. The polylactic acid may be formed by known methods, such as dehydration condensation of lactic acid (see. U.S. Pat. No. 5,310,865, which is incorporated by reference herein) or synthesis of a cyclic lactide from lactic acid followed by ring opening polymerization of the cyclic lactide (see, U.S. Pat. No. 2,758,987, which is incorporated by reference herein), for example. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

The polylactic acid may have a density of from about 1.238 g/cc to about 1.265 g/cc, or from about 1.24 g/cc to about 1.26 g/cc or from about 1.245 g/cc to about 1.255 g/cc (as determined in accordance with ASTM D792), for example.

The polylactic acid may exhibit a melt index (210° C. 2.16 kg) of from about 5 g/10 min. to about 35 g/10 min., or from about 10 g/10 min. to about 30 g/10 min. or from about 10 g/10 min. to about 20 g/10 min (as determined in accordance with ASTM D1238), for example.

The polylactic acid may exhibit a crystalline melt temperature ($T_m$) of from about 150° C. to about 180° C., or from about 160° C. to about 175° C. or from about 160° C. to about 170° C. (as determined in accordance with ASTM D3418), for example.

The polylactic acid may be an amorphous resin without crystallinity such as NatureWorks PLA4060.

The polylactic acid may exhibit a glass transition temperature of from about 45° C. to about 85° C., or from about 50° C. to about 80° C. or from about 55° C. to about 75° C. (as determined in accordance with ASTM D3417), for example.

The polylactic acid may exhibit a tensile yield strength of from about 4,000 psi to about 25,000 psi, or from about 5,000 psi to about 20,000 psi or from about 5,500 psi to about 20,000 psi (as determined in accordance with ASTM D638), for example.

The polylactic acid may exhibit a tensile elongation of from about 1.5% to about 10%, or from about 2% to about 8% or from about 3% to about 7% (as determined in accordance with ASTM D638), for example.

The polylactic acid may exhibit a flexural modulus of from about 250,000 psi to about 600,000 psi, or from about 300,000 psi to about 550,000 psi or from about 400,000 psi to about 500,000 psi (as determined in accordance with ASTM D790), for example.

The polylactic acid may exhibit a notched Izod impact of from about 0.1 ft-lb/in to about 0.8 ft-lb/in. or from about 0.2 ft-lb/in to about 0.7 ft-lb/in or from about 0.4 ft-lb/in to 0.6 about ft-lb/in (as determined in accordance with ASTM D256), for example.

The modified polyolefin may include from about 1 wt. % to about 49 wt. %, or from about 5 wt. % to about 30 wt. % or from about 5 wt. % to about 20 wt. % polylactic acid based on the total weight of the modified polyolefin, for example.

In one or more embodiments. the modified polyolefin further includes a reactive modifier. The reactive modifier may be incorporated into the modified polyolefin via a variety of methods. For example, the olefin based polymer and the polylactic acid may be contacted with one another in the presence of the reactive modifier. As used herein, the term "reactive modifier" refers to polymeric additives that, when added to a molten blend of immiscible polymers (e.g., the olefin based polymer and the PLA), form compounds in situ that serve to stabilize the blend. The compounds formed in situ compatibilize the blend and the reactive modifiers are precursors to these compatibilizers.

In one or more embodiments, the reactive modifier includes an epoxy-functionalized polyolefin. Examples of epoxy-functionalized polyolefins include epoxy-functionalized polypropylene, such as glycidyl methacrylate grafted polypropylene (PP-g-GMA), epoxy-functionalized polyethylene, such as polyethylene co glycidyl methacrylate (PE-co-GMA) and combinations thereof, for example.

In one or more embodiments, the reactive modifier is selected from oxazoline-grafted polyolefins, maleated polyolelin-based ionomers, isocyanate (NCO)-functionalized polyolefins and combinations thereof, for example. The oxazoline-grafted polyolefin is a polyolefin grafted with an oxazoline ring-containing monomer. In one or more embodiments, the oxazoline may include a 2-oxazoline, such as 2-vinyl-2-oxazoline. (e.g., 2-isopropenyl-2-oxazoline), 2-fatty-alkyl-2-oxazoline (e.g., those obtainable from the ethanolamide of oleic acid, linoleic acid, palmitoleic acid, gadoleic acid, erucic acid and/or arachidonic acid) and combinations thereof, for example. In yet another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof, for example. The oxazoline-grafted polyolefin may include from about 0.1 wt. % to about 10 wt. % or from 0.2 wt. % to about 2 wt. % oxazoline, for example.

The isocyanate (NCO)-functionalized polyolefins include a polyolefin grafted with an isocyanate functional monomer. The isocyanate may be selected from TMI® unsaturated isocyanate (meta), meta and para-isopropenyl-alpha, alpha-dimethylbenzyl isocyanate; meta-isopropenyl-alpha, alpha-dimethylbenzyl isocyanate; para-isopropenyl-alpha, alpha-dimethylbenzyl isocyanate and combinations thereof; for example.

The maleated polyolefin-based ionomers include a polyolefin ionomer maleated and then neutralized with a metal component. Maleation is a type of grafting wherein maleic anhydride, acrylic acid derivatives or combinations thereof are grafted onto the backbone chain of a polymer. The metal component may be selected from sodium hydroxide, calcium oxide, sodium carbonate, sodium hydrogencarbonate, sodium methoxide, sodium acetate, magnesium ethoxide, zinc acetate, diethylzine, aluminium butoxide, zirconium butoxide and combinations thereof, for example. In one specific embodiment, the metal component is selected from sodium hydroxide, zinc acetate and combinations thereof, for example.

In one or more embodiments, the graftable polymer is a polyoletin is selected from polypropylene, polyethylene, combinations thereof and copolymers thereof.

The reactive modifiers may be prepared by any suitable method. For example, the reactive modifiers may be formed by a grafting reaction. The grafting reaction may occur in a molten state inside of an extruder, for example (e.g., "reactive extrusion"). Such grafting reaction may occur by feeding the feedstock sequentially along the extruder or the feedstock may be pre-mixed and then fed into the extruder, for example.

In one or more embodiments, the reactive modifiers are formed by grafting in the presence of an initiator, such as peroxide. Examples of initiators may include LUPERSOL® 101 and TRIGANOX® 301, commercially available from Arkema, Inc., for example.

The initiator may be used in an amount of from about 0.01 wt. % to about 2 wt. % or from about 0.2 wt. % to about 0.8 wt. % or from about 0.3 wt. % to about 0.5 wt. % based on the total weight of the reactive modifier, for example.

Alternatively, the reactive modifiers may be formed by grafting in the presence of an initiator, such as those described above, and a modifier selected from multi-functional acrylate comonomers, styrene, triacrylate esters and combinations thereof, for example. The multi-functional acrylate comonomer may be selected from polyethylene glycol diacrylate, trimethylolpropane triacrylate (TMPTA), alkoxylated hexanediol diacrylatete and combinations thereof, for example. The triacrylate esters may include trimethylopropane triacrylate esters, for example. It has unexpectedly been observed that the modifiers described herein are capable of improving grafting compared to processes absent such comonomers.

In one or more embodiments, the reactive modifier may include from about 80 wt. % to about 99.5 wt. %, or from about 90 wt. % to about 99 wt. % or from about 95 wt. % to about 99 wt. % polyolefin based on the total weight of the reactive modifier, for example.

In one or more embodiments, the reactive modifier may include from about 0.5 wt. % to about 20 wt. %, or from about 1 wt. % to about 10 wt. % or from about 1 wt. % to about 5 wt. % grafting component (i.e., the oxazoline, isocyanate, maleic anhydride, acrylic acid derivative) based on the total weight of the reactive modifier, for example.

In one or more embodiments, the reactive modifier may include from about 0.1 wt. % to about 15 wt. %, or from about 1 wt. % to about 10 wt. % or from about 1 wt. % to about 5 wt. % modifier on the total weight of the reactive modifier, for example.

The ratio of grafting component to modifier may vary from about 1:5 to about 10:1, or from about 1:2 to about 5:1 or from about 1:1 to about 3:1, for example.

In one or more embodiments, the reactive modifier may exhibit a grafting yield of from about 0.2 wt. % to about 20 wt. %, or from about 0.5 wt. % to about 10 wt. % or from about 1 wt. % to about 5 wt. %, for example. The exalting yield may be determined by Fourier Transform Infrared Spectroscopy (FTIR) spectroscopy.

The modified polyolefin may include from about 0.5 wt. % to about 20 wt. %, or from about 1 wt. % to about 10 wt. % or from about 3 wt. % to about 5 wt. % reactive modifier based on the total weight of the blend, for example.

In an embodiment, the modified polyolefin, the olefin based polymer, the polylactic acid, the reactive modifier or combinations thereof may contain additives to impart desired physical properties, such as printability, increased gloss, or a reduced blocking tendency. Examples of additives may include, without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart desired properties.

The modified polyolefin may exhibit a melt flow rate of from about 0.1 g/10 min. to about 500 g/10 min., or from about 1.5 g/10 min. to about 50 g/10 min. or from about 5.0 g/10 min. to about 20 g/10 min, for example. (MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.)

The modified polyolefin is useful in applications known to one skilled in the art to be useful for conventional polymeric compositions, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films. oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

One or more embodiments of the invention include utilizing the modified polyolefin in solid state stretching applications, such as thermoforming, drawn tape, drawn monofilament, mono direction oriented film, biaxially oriented film, solid state extrusion and injection stretch blow molding, for example.

Other embodiments of the invention include utilizing the modified polyolefins in melt formed films, such as blown films and cast films. Blown films may be formed by forcing molten polymer through a circular die, which is then blown. The resultant bubble is then flattened and cut into strips, that when rolled, produces rolls of flat film. In contrast, cast films may be formed by passing molten polymer through an extruder, forcing the resultant thin layer over a chill roll to form a cool roll. The resulting cool roll is then cut and rolled into the cast film.

The formed films are often used in packaging applications requiring heat sealing. Often, heating for heat sealing applications is carried out by contacting the surfaces opposite those to be joined with a hot object such as a hot bar, or heating the surfaces with hot air or infrared radiation. The speed at which one can heat the surfaces to the proper temperature for joining often determines the speed at which one can heat seal the surfaces. This is particularly true for thermoplastics, such as polyolefins, because they often have relatively low thermal conductivities. High-speed heat sealing is important because many such operations are high volume continuous operations where slow heat sealing speeds significantly increase costs.

One way to increase heat-sealing speeds is to lower the temperature at which the seal may be formed, often referred to as the seal initiation temperature (SIT). This may be done by lowering the melting point of the polyolefin being sealed. However, if the melting point of the polymer is lowered too much, the seal itself may be too weak or the polymer characteristics may be detrimentally affected. Embodiments of the invention are capable of lowering the SIT of polyolefins without the loss of seal strength, tensile, or polyolefin modulus.

The embodiments described herein include polyolefin blends containing small amounts of PLA. PLA does not necessarily lower the melting point of polyolefins, but significantly lowers its heat seal temperatures while retaining high heal seal strengths, tensile and modulus properties (described further below).

The modified polyolefin generally exhibits a reduced SIT compared to a non-modified polyolfin, while retaining or even improving other properties such as hot tack, yield strength, break strength, average ultimate heat seal strength, elongation at yield, elongation at break, and clarity, for example. In one or more embodiments, the modified polyolefin exhibits a SIT that is from 1° C. to 10° C. or from 2° C. to 8° C. or at least 4° C. lower than the polyolefin absent the polylactic acid modification.

Heat seal properties may be measured using, for example, a Theller Model HT Heatsealer testing device that simulates commercial sealing apparati and then determines the characterstics of the heat seals formed. The obtained heat seal curves indicate the seal strength of two films bonded at a series of temperatures. Because heat seal curves shift to lower temperatures for lower melting resins, interpolations from this data provide seal initiation temperature (SIT) values.

The average SIT at an average ultimate heat seal strength of 0.77 N/cm for the film may be less than about 120° C., or less than about 105° C. or less than about 103° C., for example.

Hot tack is the strength of a hot seal measured at a specified time interval after completion of the sealing cycle but prior to the seal reaching ambient temperature. A seal temperature that is too cold results in a weak seal, as does a seal temperature that is too hot. Hot tack curves should ideally be bell-shaped, indicating the maximum hot seal strength possible and the processing window for obtaining acceptably high seal strength values. It is generally observed that the hot tack curves shift to lower temperatures as the ethylene concentration increases. The hot tack at 500 ms values may range from about 0.25 to about 0.90 N/cm, or from about 0.30 to about 0.90 N/cm or from about 0.40 to about 0.85 N/cm over a temperature range of from about 105° C. to about 123° C. (generally referred to as hot tack range), for example. It has been observed that despite the lowering of SIT for the modified olefin based polymers described herein, such polymers retain a broad hot tack range. For example, the olefin based polymers may retain a hot tack range of at least 20° C. or 25° C. or 30° C. or from about 20° C. to about 35° C.

EXAMPLES

Example 1

Effect of PLA Loading

An 11 g/10 min melt flow metallocene random copolymer (DSC melting point 119° C.), designated as Polymer-A, was melt blended with 5%, 10%, and 20% of NatureWorks PLA4060D, a commercially available amorphous PLA resin. The blends were made into cast films approximately 2.0 mm thick. Table 1 below shows the optical properties and heat seal characteristics of the formed films.

TABLE 1

| Characterizations | | Polymer A | w/5% PLA | w/10% PLA | w/20% PLA |
|---|---|---|---|---|---|
| Optical | Gloss 45 | 88.6 | 78 | 69.6 | 58 |
| | haze % | 0.5 | 8.5 | 12.9 | 26.6 |
| SIT | 0.77 N/cm | 105.8 | 96.6 | 94.1 | 89.8 |
| | 0.93 N/cm | 107.0 | 97.7 | 95.2 | 94 |
| Hot tack temp* | Low | 80.1 | 80.7 | 79.4 | 78.3 |
| | High | 110.8 | 109.8 | 112.1 | 138.6 |

*Hot Tack Temp @ 0.4 N/cm @ 250 msec

As shown in Table 1, the average SIT of the neat POLYMER A is about 105.8° C. at 0.77 N/cm, while the POLYMER A/5% PLA4060D, POLYMER A/10% PLA4060D and the POLYMER A/20% PLA4060D have an average SIT of about 96.6° C., 94.1° C. and 89.8° C. at 0. 77 N/cm, respectively. Further, the average SIT of the neat POLYMER A is about 107.0° C. at 1.93 N/cm, while POLYMER A/5% PLA4060D, POLYMER A/10% PLA4060D and the POLYMER A/20% PLA4060D have an average SIT of about 97.7° C., 95.2° C. and 94° C. at 1.93 N/cm.

FIG. 1 illustrates heat seal curves for a neat cast film having POLYMER A and three PLA blended cast films. The neat cast film having POLYMER A is depicted by the diamonds. The POLYMER A/5% PLA4060D cast film is depicted by the squares. The POLYMER A/10% PLA4060D cast film is depicted by the triangles. The POLYMER A/20% PLA4060D cast film is depicted by the circles. For the heat seal curves, the Seal Force in N/cm is shown on the y-axis while the temperature in ° C. is shown on the x-axis. When compared with the neat cast film, the PLA-containing cast films have heat seal curves that are shifted to significantly lower temperatures. For example, the seal in temperature (SIT) at either 0.77 N/cm or 1.93 N/cm was lowered by more than 10° C. when compared to the neat cast films.

Table 1 also lists the hot tack results for the neat cast film having POLYMER A and the three PLA blended cast films. The lower and higher temperature limits for hot tack strength greater than 0.4 N/cm are designated as low and high hot tack temperature range. The neat cast film having POLYMER A has a hot tack temperature range of 80.1-110.8° C. The POLYMER A/5% PLA4060D cast film has a hot tack temperature range of 80.7-109.8° C. The POLYMER A/10% PLA4060D cast film has a hot tack temperature range of 79.4-112.1° C. The POLYMER A/20% PLA4060D cast film has a hot tack temperature range of 78.3-138.6° C. In general, it was observed that the hot tack temperature window broadens with increasing PLA.

The cast films in Table 1 were characterized for mechanical properties. The results of tear resistance, tensile properties, and instrumented impact properties are summarized in Table 2.

TABLE 2

| Characterizations | | Polymer A | w/5% PLA | w/10% PLA | w/20% PLA |
|---|---|---|---|---|---|
| Tear resistance | MD(g) | 83.6 | 65.9 | 52.8 | 98.5 |
| | TD (g) | 83.7 | 75.8 | 55.1 | 61.6 |
| | TD/MD | 1 | 1.2 | 1 | 0.6 |
| MD tensile | 1% Secant, kpsi | 61 | 72 | 80 | 124 |
| | Yld strength, psi | 2552 | 2756 | 2918 | 3772 |
| | Brk strength, psi | 4740 | 6027 | 5977 | 6170 |
| | yield % | 10.3 | 9.3 | 8.3 | 4.1 |
| | break % | 603 | 680 | 670 | 638 |
| TD tensile | 1% Secant, kpsi | 67 | 66 | 86 | 101 |
| | Yld strength, psi | 2355 | 2542 | 2821 | 2928 |
| | Brk strength, psi | 4053 | 4228 | 4346 | 3118 |
| | yield % | 7.7 | 7.6 | 7.4 | 4.6 |
| | break % | 596 | 581 | 601 | 550 |
| Instrumented impact | Max load, lbf | 11 | 10.2 | 9.3 | 6.3 |
| | Energy to brk, in-lb | 7.35 | 5.92 | 6.36 | 1.12 |
| | Total energy, in-lb | 7.71 | 7.64 | 7.49 | 1.31 |

The PLA is much stiffer than polypropylene. Therefore, the cast films containing PLA had higher stiffness and strengths at both yield point and break point, as depicted in Table 1. 5% and 10% PLA did not significantly change cast film impact resistance. When 20% PLA was used, the cast film became much easier to break during impact test.

Example 2

Effect of PLA Type

Polymer-A was melt blended with 10% of two different NatureWorks PLA resins, PLA4060D which is an amorphous PLA resin and PLA6202, which is a semi-crystalline PLA resin. The materials were made into cast films approximately 2.0 mm thick. Table 3 below shows the heat seal characteristics of the formed films.

TABLE 3

| | Polymer A | POLYMER A/ 10% PLA4060D | POLYMER A/ 10% PLA6201D |
|---|---|---|---|
| Avg. Force SIT @ 0.77 N/cm (° C.) | 105.8 | 98.5 | 98.2 |
| Avg. Force SIT @ 1.93 N/cm (° C.) | 107.0 | 100.2 | 100.2 |
| Low Hot Tack Temp @ 0.4 N/cm @ 250 msec (° C.) | 85.6 | 83.4 | 83.6 |
| High Hot Tack Temp @ 0.4 N/cm @ 250 msec (° C.) | 116.7 | 115.7 | 115.7 |

As shown in Table 3, the average SIT of the neat POLYMER A was about 105.8° C. at 0.77 N/cm, while the POLYMER A/10% PLA4060D and the POLYMER A/10% PLA6201D had an average SIT of about 98.5° C. and 98.2° C. at 0.77 N/cm, respectively. Further, the average SIT of the neat POLYMER A was about 107.0° C. at 1.93 N/cm, while POLYMER A/10% PLA4060D and POLYMER A/10% PLA6201D had an average SIT of about 100.2° C. at 1.93 N/cm.

Figure 2:
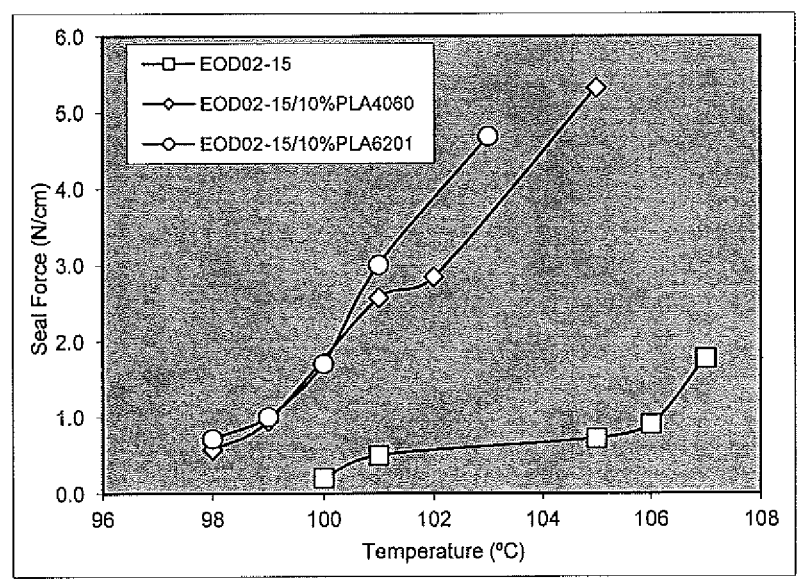
FIG. 2 illustrates heat seal curves for various polymer samples in Example 2.

FIG. 2 illustrates heat seal curves for a neat cast film having POLYMER A and two PLA blended cast films. The neat cast film having POLYMER A is depicted by the squares 100. The POLYMER A/10% PLA4060D cast film is depicted by the diamonds 102. The POLYMER A/10% PLA6201D cast film is depicted by the circles 104. For the heat seal curves the Seal Force in N/cm is shown on the y-axis while the temperature in ° C. is shown on the x-axis. When compared with the neat cast film, the 10PLA cast films have heat seal curves that are shifted to significantly lower temperatures. The seal in temperature (SIT) at either 0.77 N/cm or 1.93 N/cm was lowered about 7° C. for the 10% PLA blends when compared to the neat cast films.

Figure 3:
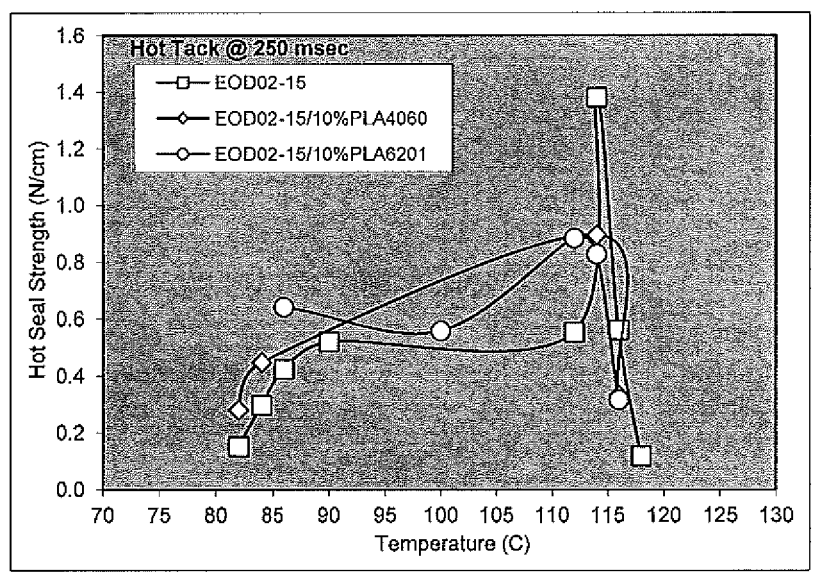
FIG. 3 illustrates hot tack curves for various polymer samples in Example 2.

FIG. 3 illustrates hot tack curves for the neat cast film having POLYMER A and the two PLA blended cast films. As in FIG. 2, the neat cast film having POLYMER A is depicted by the squares 100. The POLYMER A/10% PLA4060D cast film is depicted by the diamonds 102. The POLYMER A/10% PLA6201D cast film is depicted by the circles 104. The hot tack curves in FIG. 2 hot seal strength in N/cm is depicted along the y-axis, while the temperature in ° C. is depicted along the x-axis. As shown, the 10% PLA cast films exhibit a similarly broad hot tack to the neat cast film.

Table 4 below shows the tensile mechanical properties of the cast films in Table 3 in the machine direction.

TABLE 4

| | Polymer A | Polymer A 10% PLA4060D | Polymer A 10% PLA6201D |
|---|---|---|---|
| Cast film thickness, mil | 2.1 (0.1) | 1.9 (0.2) | 1.9 (0.1) |
| 1% secant modulus, kpsi | 75 (2) | 87 (12) | 89 (5) |
| MD yield strength, kpsi | 2575 (53) | 2797 (87) | 2785 (155) |
| MD break strength, kpsi | 4276 (380) | 6667 (400) | 5350 (702) |
| Elongation at yield, % | 9.0 (0.9) | 6.7 (0.8) | 7.2 (0.3) |
| Elongation at break, % | 594 (36) | 733 (9) | 637 (61) |
| Haze, % | 0.1 (0.0) | 15.0 (0.9) | 14.4 (0.9) |

The PLA may be much stiffer than polypropylene. Therefore, the cast films containing 10% PLA typically had higher stiffness and strengths at both yield point and break point, as depicted in Table 4. Further, due to the incompatibility of the blends, the cast films containing the PLA components may be hazier than the neat cast films.

Example 3

Effect of PP/PLA Compatibilization

Polymer-A was melt blended with 10% of NatureWorks PLA3251, which is a semi-crystalline PLA resin. 3% functional resins were used as compatibilizers, including Lotader AX8840 epoxy-functionalized polyethylene, or epoxy-functionalized PP (PP-g-GMA). The materials were made into cast films approximately 2.0 mm thick. Table 5 below shows the heat seal characteristics of the formed films.

TABLE 5

|  | Polymer A | w/PLA | w/PLA/ Lotader | w/PLA/ PP-g-GMA |
|---|---|---|---|---|
| SIT @ 0.77 N/cm (° C.) | 100.3 | 93.0 | 93.4 | 95.1 |
| SIT @ 1.93 N/cm (° C.) | 102.3 | 94.3 | 94.5 | 96.3 |
| Low Hot Tack Temp @ 0.4 N/cm @ 250 msec (° C.) | 81.4 | 82.0 | 82.3 | 84.4 |
| High Hot Tack Temp @ 0.4 N/cm @ 250 msec (° C.) | 102.8 | 113.1 | 111.3 | 113.3 |

Figure 4:
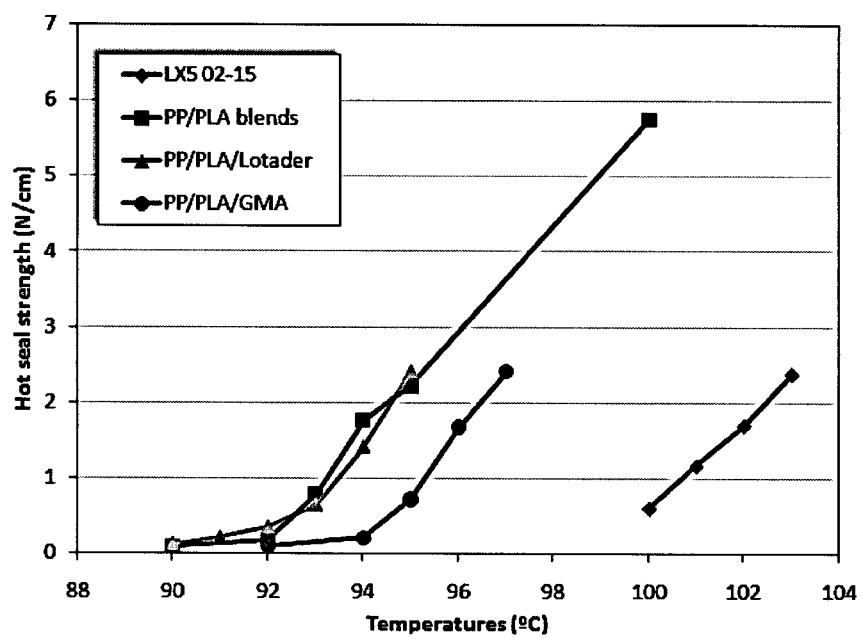
FIG. 4 illustrates heat seal curves for various polymer samples in Example 3.

As shown in Table 5, compared with neat Polymer A, the heat seal curve was shifted significantly to lower temperature when 10% PLA resin was added. The seal initiation temperature (SIT) at either 0.77 N/cm or 1.93 N/cm was lowered by about 7° C. from those of neat LX5 02-15. When Lotader was used as the compatibilizer, the SIT's appeared to be essentially the same as Polymer A/PLA binary blend (FIG. 4). However, as PP-g-GMA was produced based on a high melting point PP homopolymer, addition of PP-g-GMA to PP/PLA blend moderately raised the SIT of PP/PLA blend, but still much lower than those of neat Polymer A films. All the Polymer A/PLA blend films exhibited similarly broad hot tack range to neat Polymer A.

The cast films in Table 5 were also characterized for mechanical properties. The tear resistance, tensile mechanical properties, and impact resistance are listed in Table 6.

TABLE 6

|  | LX5 02-15 | w/PLA | w/PLA/ Lotader | w/PLA/ PP-g-GMA |
|---|---|---|---|---|
| Melt Flow Rate (g/10 min) | 11.3 | 13.3 | 12.6 | 12.9 |
| Tear Resistance-MD (g) | 123.1 | 88.7 | 100.3 | 102.1 |
| Tear Resistance-TD (g) | 172.3 | 113.9 | 116.6 | 112 |
| Tear Ratio TD/MD | 1.4 | 1.3 | 1.2 | 1.1 |
| MD 1% Secant modulus (kpsi) | 73 | 96 | 87 | 89 |
| MD Tensile Strgth at Yld (psi) | 2470 | 2810 | 2680 | 2745 |
| MD tensile Strgth at Break (psi) | 4840 | 5155 | 5137 | 5627 |
| MD Elongation at Yld (%) | 9.8 | 7.8 | 8.9 | 7.5 |
| MD Elongation at Break (%) | 658.4 | 642.5 | 658.5 | 691.3 |
| TD 1% Secant modulus (kpsi) | 73 | 81 | 74 | 75 |
| TD Tensile Strgth at Yld (psi) | 2486 | 2533 | 2413 | 2509 |
| TD Tensile Strgth at Break (psi) | 4391 | 3294 | 3521 | 3667 |
| TD Elongation at Yld (%) | 9.9 | 6.8 | 7.9 | 7.4 |
| TD Elongation at Break (%) | 659.5 | 549.3 | 592.8 | 601.9 |
| Film Thickness (mil) | 2.1 | 1.9 | 1.9 | 1.9 |
| Maximum Load (ldf) | 17.66 | 15.61 | 14.75 | 13.71 |
| Energy to Max Load (in-lb) | 14.85 | 4.94 | 7.35 | 4.13 |
| Total Energy (in-lb) | 15.38 | 11.55 | 12.26 | 10.94 |
| Falling Dart (gmf) | 432.3 | 319.4 | 340.3 | 301.1 |

As shown in Table 6, compared with neat Polymer A films (haze=0.3%), the Polymer A/PLA blend films appeared to be relatively hazier (haze=~12%), but film contact clarity was still excellent. In general, Polymer A/PLA blends exhibited lower film tear resistance than neat Polymer A films, but compatibilization moderately improved the blend film tear resistance. Typically, presence of PLA increased Polymer A film stiffness and strengths at yield and break, but moderately lowered the impact resistance. The compatibilized Polymer A/PLA films appeared to have higher tensile elongation at break than simple Polymer A/PLA binary blend in both machine and transversal directions.

Example 4

Effect on Ziegler-Natta Random Copolymer

Total Petrochemical 6572 (8.0 g/10 min ZN-RCP) and 8573 (6.8 g/10 min ZN-RCP) were melt blended with 10% of NatureWorks PLA4060 which is an amorphous PLA resin, respectively. 5% Lotader AX8840 epoxy-functionalized polyethylene was used as the compatibilizer. All the materials were made into 2 mil thick cast films, and Table 7 shows the FDA extractables, optical properties, and heat seal characteristics of the formed films.

TABLE 7

| Characterizations | | 6572 | 6572/ 10% PLA | 6572/ 10% PLA/ 5% Lotader | 8573 | 8573/ 10% PLA |
|---|---|---|---|---|---|---|
| FDA % | Extractable % | 3.43 | 2.04 | 1.83 | 3.16 | 1.54 |
| Optical | Gloss 45 | 81.3 | 66.2 | 43.6 | 84.9 | 62.6 |
|  | haze % | 7.7 | 17.7 | 24.8 | 1.8 | 14.9 |
| SiT | 0.77 N/cm | 120.6 | 116.9 | 113.8 | 115.1 | 106.8 |
|  | 1.93 N/cm | 126 | 123.3 | 120.4 | 117.2 | 111.4 |
| Hot tack temp.* | Low | 120 | 113 | 106 | 119 | 116 |
|  | High | 133 | 134 | 136 | 125 | 126 |

*Hot Tack Temp @ 0.4 N/cm @ 250 msec

Figure 5:
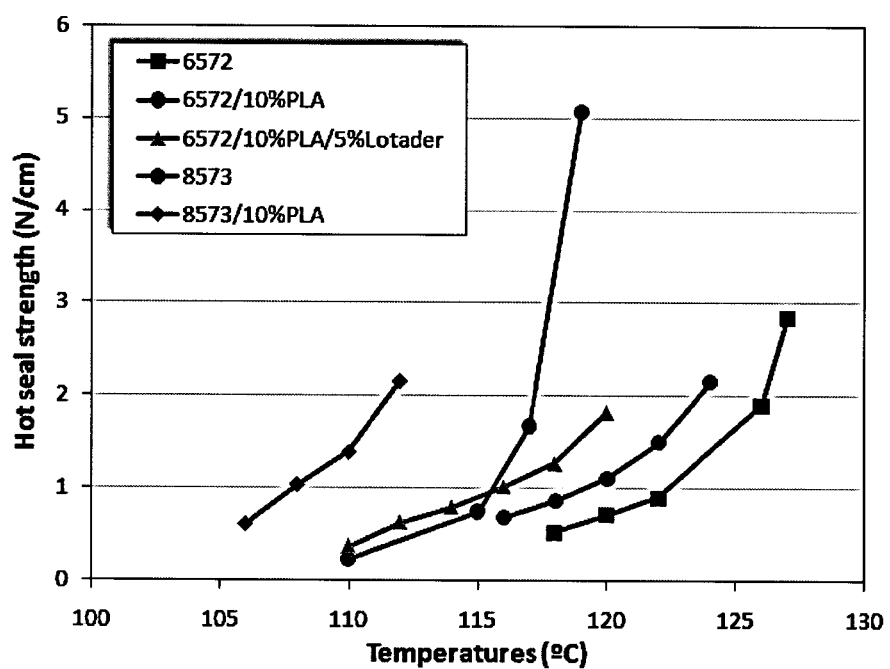
FIG. 5 illustrates heat seal curves for various polymer samples in Example 4.
Figure 6:
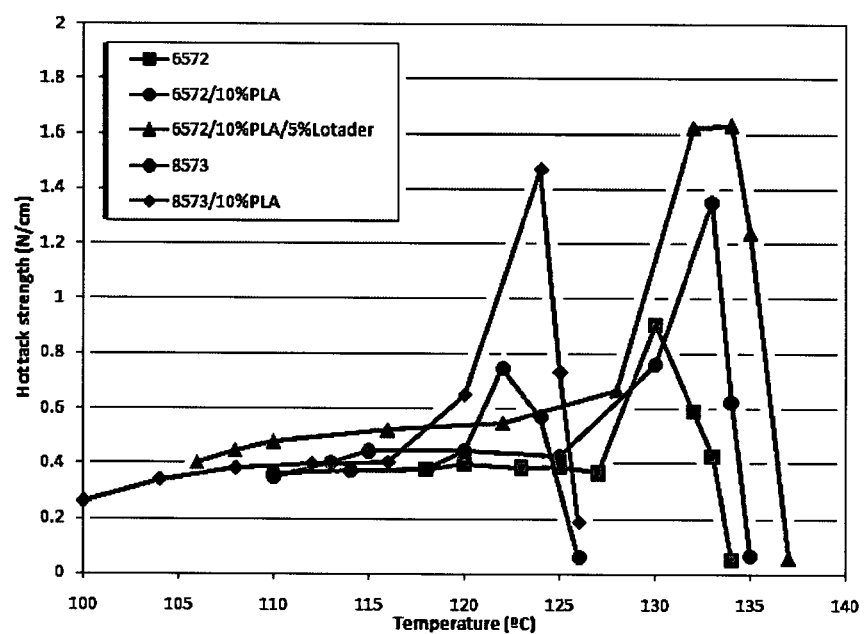
FIG. 6 illustrates hot tack curves for various polymer samples in Example 4.

As shown in Table 7, compared with neat 6572 or 8573, addition of 10% PLA significantly lowered the FDA extractables, making the formulations more suitable for medical heat seal applications. The seal initiation temperature (SIT) at either 0.77 N/cm or 1.93 N/cm was lowered by about 3~8° C. from those of neat resins, as also evidenced by the heat seal curve shift to lower temperature when 10% PLA resin was added. When Lotader was used as the compatibilizer, the SIT's appeared to be further lowered (FIG. 5). All the blend films exhibited as broad hot tack range as neat RCPs (FIG. 6).

The cast films in Table 7 were also characterized for mechanical properties. The tear resistance, tensile mechanical properties, and impact resistance are listed in Table 8.

TABLE 8

| Characterizations | | 6572 | 6572/10% PLA | 6572/10% PLA/5% Lotader | 8573 | 8573/10% PLA |
|---|---|---|---|---|---|---|
| Tear resistance | MD(g) | 90.4 | 56.6 | 52.3 | 94.4 | 64 |
| | TD (g) | 153.1 | 105.4 | 103.5 | 241.6 | 136.2 |
| | TD/MD | 1.7 | 1.9 | 2 | 2.6 | 2.1 |
| MD tensile | 1% Secant, kpsi | 87 ± 19 | 112 ± 9 | 113 ± 6 | 70 ± 2 | 87 ± 15 |
| | Yld strength, psi | 2902 ± 36 | 3142 ± 50 | 3228 ± 92 | 2583 ± 125 | 2792 ± 68 |
| | Brk strength, psi | 6195 ± 523 | 6459 ± 621 | 6262 ± 566 | 5949 ± 404 | 5981 ± 501 |
| | yield % | 10.9 ± 0.8 | 5.9 ± 0.3 | 8.9 ± 0.5 | 12.9 ± 0.2 | 9.4 ± 0.4 |
| | break % | 655 ± 32 | 628 ± 42 | 628 ± 54 | 659 ± 29 | 633 ± 27 |
| TD tensile | 1% Secant, kpsi | 98 ± 7 | 99 ± 10 | 100 ± 7 | 66 ± 4 | 75 ± 14 |
| | Yld strength, psi | 2931 ± 219 | 2925 ± 111 | 2991 ± 63 | 2535 ± 67 | 2558 ± 55 |
| | Brk strength, psi | 4495 ± 356 | 4242 ± 229 | 4117 ± 228 | 2906 ± 530 | 3721 ± 255 |
| | yield % | 11 ± 0.3 | 6.6 ± 1.1 | 9.1 ± 0.4 | 11.8 ± 0.9 | 7.8 ± 1.2 |
| | break % | 587 ± 42 | 603 ± 24 | 619 ± 37 | 484 ± 17 | 593 ± 56 |
| Instrumented impact | Max load, lbf | 20.3 | 9.6 | 13.1 | 11.7 | 11.3 |
| | Energy to brk, in-lb | 27.7 | 2.87 | 5.56 | 3.12 | 3.22 |
| | Total energy, in-lb | 28 | 7.15 | 11.22 | 5.57 | 9.66 |

As shown in Table 8, compared with neat RCP films, RCP/PLA blends exhibited relatively lower film tear resistance. Typically, presence of PLA increased IN-RCP film stiffness and strengths at yield and break, retained or moderately lowered the impact resistance. All the ZN-RCP/PLA films appeared to have equivalent or higher tensile elongation at break than neat RCP films in both machine and transversal directions.

Example 5

Effect on Metallocene HDPE

Total Petrochemical metallocene polyethylene M3410EP (M12=0.9 g/10 min. 0.934) was melt blended with 10% of NatureWorks PLA4060 which was an amorphous PLA resin. 5% Lotader AX8840 epoxy-functionalized polyethylene was used as the compatibilizer. All the materials were made into 2 mil thick cast films, and Table 9 shows the optical properties and heat seal characteristics of the formed films.

TABLE 9

| Characterizations | | M3410EP | M3410EP/10% PLA | M3410EP/10% PLA/5% Lotader |
|---|---|---|---|---|
| Optical | Gloss 45 | 59.9 | 47.8 | 29.9 |
| | haze % | 7.1 | 30.3 | 37.1 |
| SIT | 0.77 N/cm | 125.5 | 123.7 | 124.8 |
| | 1.93 N/cm | 130.2 | 128 | 128.9 |
| Hot tack temp* | Low | 116.8 | 114.8 | 116.5 |
| | High | 138.8 | 139.2 | 140.8 |

*Hot Tack Temp @ 0.4 N/cm @ 250 msec

As shown in Table 9, compared with neat M3410, cast films appeared to be hazier when 10% PLA was added. The seal initiation temperature (SIT) at either 0.77 N/cm or 1.93 N/cm was slightly lowered by about 2° C. from those of neat M3410. When Lotader was used as the compatibilizer, the SIT's appeared to be essentially the same as M3410EP/PLA binary blend at 1.93 N/cm. All the M3410EP/PLA blend films exhibited similarly broad hot tack range to neat LX5 02-15.

The cast films in Table 9 were also characterized for mechanical properties. The tear resistance, tensile mechanical properties, and impact resistance are listed in Table 10.

TABLE 10

| Characterizations | | M3410EP | M3410EP/10% PLA | M3410EP/10% PLA/5% Lotader |
|---|---|---|---|---|
| Tear resistance | MD(g) | 105.1 | 57.9 | 36.9 |
| | TD (g) | 9.1 | 66.6 | 44.9 |
| | TD/MD | 0.1 | 1.2 | 1.2 |
| MD tensile | 1% Secant, kpsi | 116 ± 32 | 150 ± 45 | 179 ± 10 |
| | Yld strength, psi | 3923 ± 87 | 4526 ± 273 | 4548 ± 204 |
| | Brk strength, psi | 5384 ± 440 | 6607 ± 855 | 4107 ± 130 |
| | yield % | 5.7 ± 0.9 | 4.4 ± 0.5 | 4.6 ± 0.8 |
| | break % | 648 ± 60 | 702 ± 94 | 497 ± 7 |
| TD tensile | 1% Secant, kpsi | 134 ± 16 | 169 ± 6 | 166 ± 5 |
| | Yld strength, psi | 3963 ± 111 | 3810 ± 159 | 3812 ± 82 |
| | Brk strength, psi | 6128 ± 1268 | 3747 ± 290 | 3884 ± 331 |
| | yield % | 6.3 ± 0.5 | 3.0 ± 0.4 | 3.4 ± 0.1 |
| | break % | 709 ± 124 | 349 ± 300 | 562 ± 24 |
| Instrumented impact | Max load, lbf | 16.6 | 5.5 | 8.9 |
| | Energy to brk, in-lb | 5.08 | 0.3 | 0.73 |
| | Total energy, in-lb | 11.77 | 0.31 | 0.76 |

As shown in Table 10, compared with neat M3410EP films, M3410EP/PLA blends exhibited relatively lower film tear resistance. Typically, presence of PLA significantly increased M3410EP film stiffness and strengths at yield, but lowered the impact resistance. All the M3410EP/PLA films appeared to have equivalent or lower tensile elongation at break than neat RCP films in both machine and transversal directions.

While the foregoing is directed to embodiments of the present invention, other and further embodiments of the invention may be devised without departing from the basic scope thereof and the scope thereof is determined by the claims that follow.

What is claimed is:

1. A film or a cap layer of co-extruded films comprising:
   a modified olefin based polymer comprising polypropylene, a reactive modifier comprising a functionalized polyolefin, and from 1 wt. % to 30 wt. % polylactic acid (PLA);
   wherein the reactive modifier is formed by grafting in the presence of an initiator and a modifier, wherein the modifier comprises polyethylene glycol diacrylate, trimethylolpropane triacrylate, alkloxylated hexanediol diacrylate, or trimethylolpropane triacrylate esters.

2. The film or cap layer of co-extruded films of claim 1, wherein the film or cap layer of co-extruded films exhibits a seal initiation temperature that is less than 125° C.

3. The film or cap layer of co-extruded films of claim 1, wherein the polypropylene is a metallocene catalyzed polypropylene.

4. The film or cap layer of co-extruded films of claim 1, wherein the polypropylene is a Ziegler-Natta catalyzed polypropylene.

5. The film or cap layer of co-extruded films of claim 1, wherein the film or cap layer of co-extruded films exhibits a hot tack range between 80° C. and 120° C.

6. The film or cap layer of co-extruded films of claim 1, wherein the modified olefin based polymer comprises from 5 wt. % to 20 wt. % of the PLA.

7. The film or cap layer of co-extruded films of claim 1, wherein the PLA is amorphous, crystalline or a combination thereof.

8. The film or cap layer of co-extruded films of claim 1, wherein the modified olefin based polymer comprises from 1-10% of the reactive modifier.

9. The film or cap layer of co-extruded films of claim 1, wherein the functionalized polyolefin comprises the epoxy-functionalized polypropylene.

10. The film or cap layer of co-extruded films of claim 1, wherein the modifier further comprises styrene.

11. The film or cap layer of co-extruded films of claim 1, wherein the modifier comprises polyethylene glycol diacrylate or alkloxylated hexanediol diacrylate.

12. A method of forming a film comprising:
    providing a modified olefin based polymer comprising polypropylene, a reactive modifier comprising a functionalized polyolefin, and from 1 wt. % to 30 wt. % polylactic acid (PLA), wherein the reactive modifier is formed by grafting in the presence of an initiator and a modifier, wherein the modifier comprises polyethylene glycol diacrylate, trimethylolpropane triacrylate, alkloxylated hexanediol diacrylate, or trimethylolpropane triacrylate esters; and
    forming the modified olefin based polymer into a film.

13. The method of claim 12, wherein the polypropylene is a metallocene catalyzed polypropylene.

14. The method of claim 12, wherein the polypropylene is a Ziegler-Natta catalyzed polypropylene.

15. The method of claim 12, wherein the film exhibits a seal initiation temperature that is less than 125° C.

16. The method of claim 12, wherein the film exhibits a hot tack range between 80° C. and 120° C.

17. The method of claim 12, wherein the modified olefin based polymer comprises from 5 wt. % to 20 wt. % of the PLA.

18. The method of claim 12, wherein the modified olefin based polymer comprises from 1-10% of the reactive modifier.

19. The method of claim 12, wherein the functionalized polyolefin comprises the epoxy-functionalized polypropylene.

20. The method of claim 12, wherein the modifier further comprises styrene.

21. The method of claim 12, wherein the modifier comprises polyethylene glycol diacrylate or alkloxylated hexanediol diacrylate.

* * * * *